(12) United States Patent
Camp et al.

(10) Patent No.: US 10,101,931 B1
(45) Date of Patent: Oct. 16, 2018

(54) MITIGATING READ ERRORS FOLLOWING PROGRAMMING IN A MULTI-LEVEL NON-VOLATILE MEMORY

(71) Applicant: INTERNATIONAL BUSINESS MACHINES CORPORATION, Armonk, NY (US)

(72) Inventors: Charles J. Camp, Sugar Land, TX (US); Timothy J. Fisher, Cypress, TX (US); Aaron D. Fry, Richmond, TX (US); Nikolas Ioannou, Zurich (CH); Thomas Mittelholzer, Zurich (CH); Nikolaos Papandreou, Thalwil (CH); Thomas Parnell, Zurich (CH); Roman Pletka, Uster (CH); Charalampos Pozidis, Thalwil (CH); Sasa Tomic, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/613,240

(22) Filed: Jun. 4, 2017

(51) Int. Cl.
*G11C 11/34* (2006.01)
*G06F 3/06* (2006.01)
*G06F 12/1009* (2016.01)

(52) U.S. Cl.
CPC .......... *G06F 3/0619* (2013.01); *G06F 3/0625* (2013.01); *G06F 3/0659* (2013.01);
(Continued)

(58) Field of Classification Search
CPC .. G06F 3/0619; G06F 12/1009; G06F 3/0659; G06F 3/0625; G06F 3/0688; G06F 2212/65
See application file for complete search history.

(56) References Cited

U.S. PATENT DOCUMENTS 7,193,896 B2 3/2007 Shiga
8,054,682 B2 11/2011 Kang et al.
(Continued)

OTHER PUBLICATIONS

Park et al. "A Zeroing Cell-to-Cell Interference Page Architecture With Temporary LSB Storing and Parallel Program Scheme for MLC NAND Flash Memories", IEEE Journal of Solid-State Circuits, vol. 43, No. 4, Apr. 2008.

*Primary Examiner* — Mohammed A Bashar
(74) *Attorney, Agent, or Firm* — Brian F. Russell; Randall J. Bluestone

(57) ABSTRACT

Read errors following programming in a multi-level non-volatile memory are mitigated by a controller of the non-volatile memory. The controller temporarily buffers, in a cache, pages of data programmed into the non-volatile memory. In response to receiving a read request for a target page of data programmed into the non-volatile memory, where the read request is received during a delay time affecting the target page, the controller services the read request by accessing data of the target page in the cache in response to the read request hitting in the cache. The controller instead services the read request from the non-volatile memory in response to the read request missing in the cache. When servicing the read request from the non-volatile memory, the controller preferably reads the target page from the non-volatile memory utilizing a set of read voltage thresholds determined based on the read-after-write delay.

19 Claims, 7 Drawing Sheets

(52) U.S. Cl.
CPC ........ *G06F 3/0688* (2013.01); *G06F 12/1009* (2013.01); *G06F 2212/65* (2013.01)

(56) References Cited

U.S. PATENT DOCUMENTS

| | | |
|---|---|---|
| 8,374,031 B2 | 2/2013 | Yuh |
| 9,093,171 B2 | 7/2015 | Kim et al. |
| 9,122,588 B1 * | 9/2015 | Mondal ............... G06F 12/0246 |
| 2010/0049940 A1 * | 2/2010 | Ware .................. G06F 12/0292 |
| | | 711/203 |
| 2015/0106545 A1 * | 4/2015 | Godard ............... G06F 12/0893 |
| | | 711/3 |
| 2017/0235522 A1 * | 8/2017 | Kim ...................... G06F 3/0659 |
| | | 714/773 |

* cited by examiner

US 10,101,931 B1

MITIGATING READ ERRORS FOLLOWING PROGRAMMING IN A MULTI-LEVEL NON-VOLATILE MEMORY

BACKGROUND OF THE INVENTION

This disclosure relates to data processing and data storage, and more specifically, to non-volatile memory storing multiple bits of data per cell. Still more particularly, the disclosure relates mitigating read errors following programming in a non-volatile memory system storing multiple bits of data per cell.

NAND flash memory is an electrically programmable and erasable non-volatile memory technology that stores one or more bits of data per memory cell as a charge on the floating gate of a transistor or a similar charge trap structure. The amount of charge on the floating gate modulates the threshold voltage of the transistor. By applying a proper read voltage and measuring the amount of current, the programmed threshold voltage of the memory cell can be determined and thus the stored information can be detected. Memories storing one, two, three and four bits per cell are respectively referred to in the art as Single Level Cell (SLC), Multi-Level Cell (MLC), Three Level Cell (TLC), and Quad Level Cell (QLC) memories. In a typical implementation, a NAND flash memory array is organized in blocks—of physical memory, each of which includes multiple physical pages each in turn containing a multiplicity of memory cells. By virtue of the arrangement of the word and bit lines utilized to access memory cells, flash memory arrays have generally been programmed on a page basis, but erased on a block basis.

In multi-level (i.e., MLC, TLC and QLC) NAND flash memory, information is stored by programming the memory cells to various quantized threshold voltage levels according to the device's programming algorithm, which maps the binary bit values to discrete threshold voltage levels. In response to a page read command, the binary bit values are retrieved by applying appropriate read voltages that divide the programmed threshold voltage window into discrete regimes and by then applying a reverse mapping between the detected threshold voltage levels and the corresponding binary bit values.

In multi-level flash memory, there is period following programming during which the programmed threshold voltage distributions for a page settle to their stable state. During this period, the page generally cannot be read from the flash memory without an increased number of read errors. For example, in MLC NAND flash memory, data is written in pages that form page pairs (referred to in the art as "upper page" and "lower page") which share the same physical cells on a word-line. Programming is typically accomplished utilizing a two-step process in which the lower page is first programmed with only one bit of information resulting in two threshold voltage distributions. In the second step, two bits of information are programmed in the upper and lower pages, resulting in four threshold voltage distributions. In general, the lower and upper pages forming a page pair are not consecutive in terms of programming order, and multiple other pages are instead interleaved in a way to control cell-to-cell interference. As a result of this conventional two-step programming process, correct readout of both the upper page and the associated lower page can be dependent on waiting for a delay period after programming the later programmed upper page.

BRIEF SUMMARY

The present disclosure appreciates that there is a waiting period before a recently programmed page in multi-level NAND flash can be read without an increased number of read errors. This period may be dependent on the time required for the programmed threshold voltage distributions to settle to their final state along with any other physical relaxation mechanism that may take place and which may be dependent on the underlying NAND flash technology. Specifically, for MLC NAND flash with a two-step programming process, the waiting period after programming an upper page should be preserved before reading that upper page or its associated lower page. Moreover, the present disclosure appreciates that waiting until the recommended period has elapsed before allowing a recently programmed page of multi-level flash memory to be read can result in unacceptable read performance. The present disclosure accordingly provides one or more techniques that mitigate errors induced by read accesses to recently programmed pages of a non-volatile memory.

In at least one embodiment, read errors following programming in a multi-level non-volatile memory are mitigated by a controller of the non-volatile memory. The controller temporarily buffers, in a cache, pages of data programmed into the non-volatile memory. In response to receiving a read request for a target page of data programmed into the non-volatile memory, where the read request is received during a delay period affecting the target page, the controller services the read request by accessing data of the target page in the cache in response to the read request hitting in the cache. The controller instead services the read request from the non-volatile memory in response to the read request missing in the cache. When servicing the read request from the non-volatile memory, the controller preferably reads the target page from the non-volatile memory utilizing a set of read voltage thresholds determined based on the read-after-write delay and/or the aging of the device. The described technique is applicable to a variety of memory technologies, including MLC, TLC and QLC NAND flash memories

DETAILED DESCRIPTION

Figure 1A:
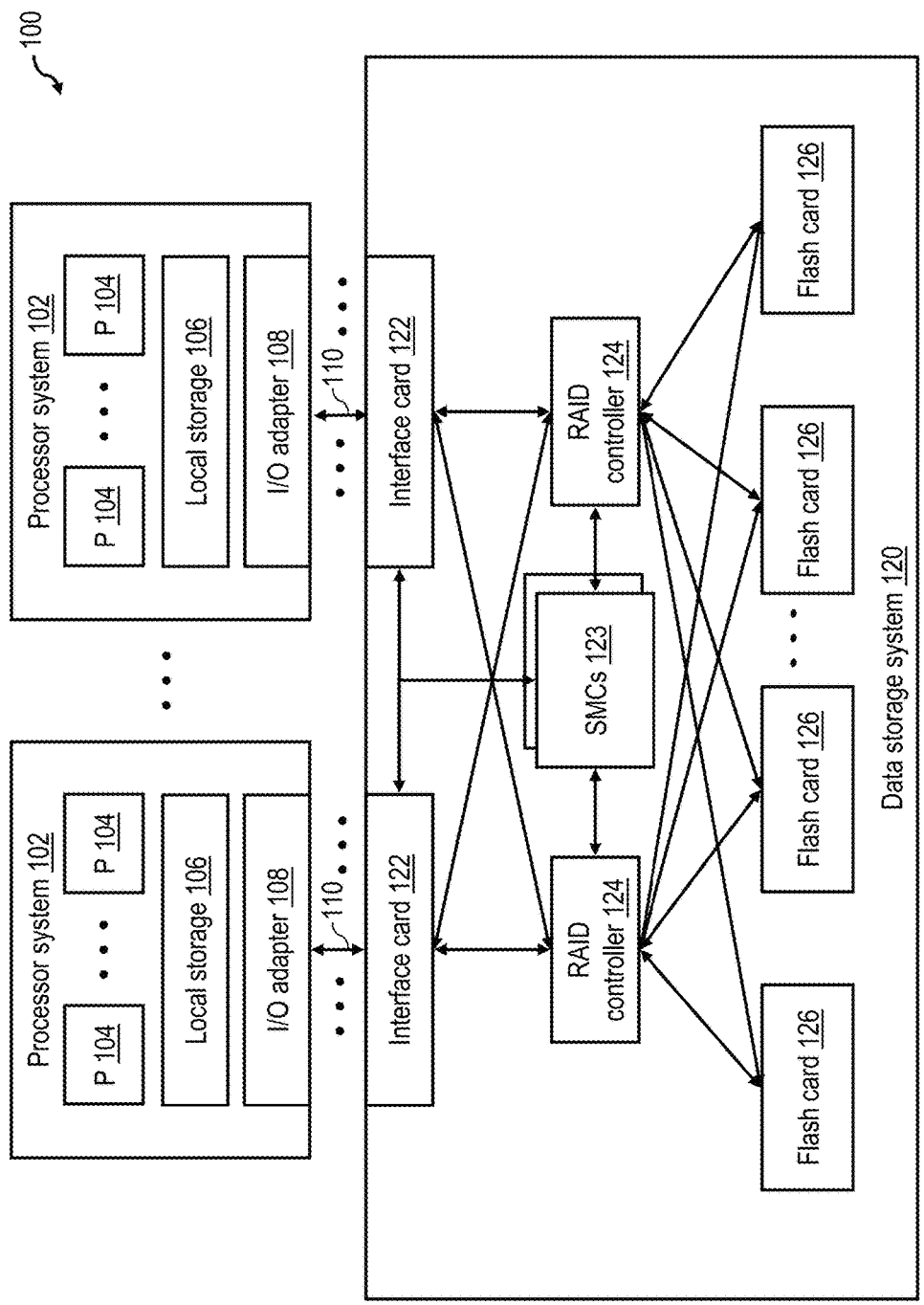
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. A processor system 102 may additionally include local storage 106 (e.g., dynamic random access memory (DRAM) or disks) that may store program code, operands and/or execution results of the processing performed by processor(s) 104. In various embodiments, a processor system 102 can be, for example, a mobile computing device (such as a smartphone or tablet), a laptop or desktop personal computer system, a server computer system (such as one of the POWER series of servers available from International Business Machines Corporation), or a mainframe computer system. A processor system 102 can also be an embedded processor system using various processors such as ARM, PowerPC, Intel X86, or any other processor combined with memory caches, memory controllers, local storage, I/O bus hubs, etc. In some embodiments, data storage system 120 may be integrated with one or more processor systems 102.

Each processor system 102 further includes an input/output (I/O) adapter 108 that is coupled directly (i.e., without any intervening device) or indirectly (i.e., through at least one intermediate device) to a data storage system 120 via an I/O channel 110. In some embodiments, data storage system 120 may be integral to a processor system 102. In various embodiments, I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O operations communicated via I/O channel 110 include read requests by which a processor system 102 requests data from data storage system 120 and write requests by which a processor system 102 requests storage of data in data storage system 120.

Although not required, in the illustrated embodiment, data storage system 120 includes multiple interface cards 122 through which data storage system 120 receives and responds to input/output operations (request) of hosts via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to non-volatile storage media, which in the illustrated example include multiple flash cards 126 bearing NAND flash memory. In other embodiments, alternative and/or additional non-volatile storage devices can be employed.

In the depicted embodiment, the operation of data storage system 120 is managed by redundant system management controllers (SMCs) 123, which are coupled to interface cards 122 and RAID controllers 124. In various embodiments, system management controller 123 can be implemented utilizing hardware or hardware executing firmware and/or software.

Figure 1B:
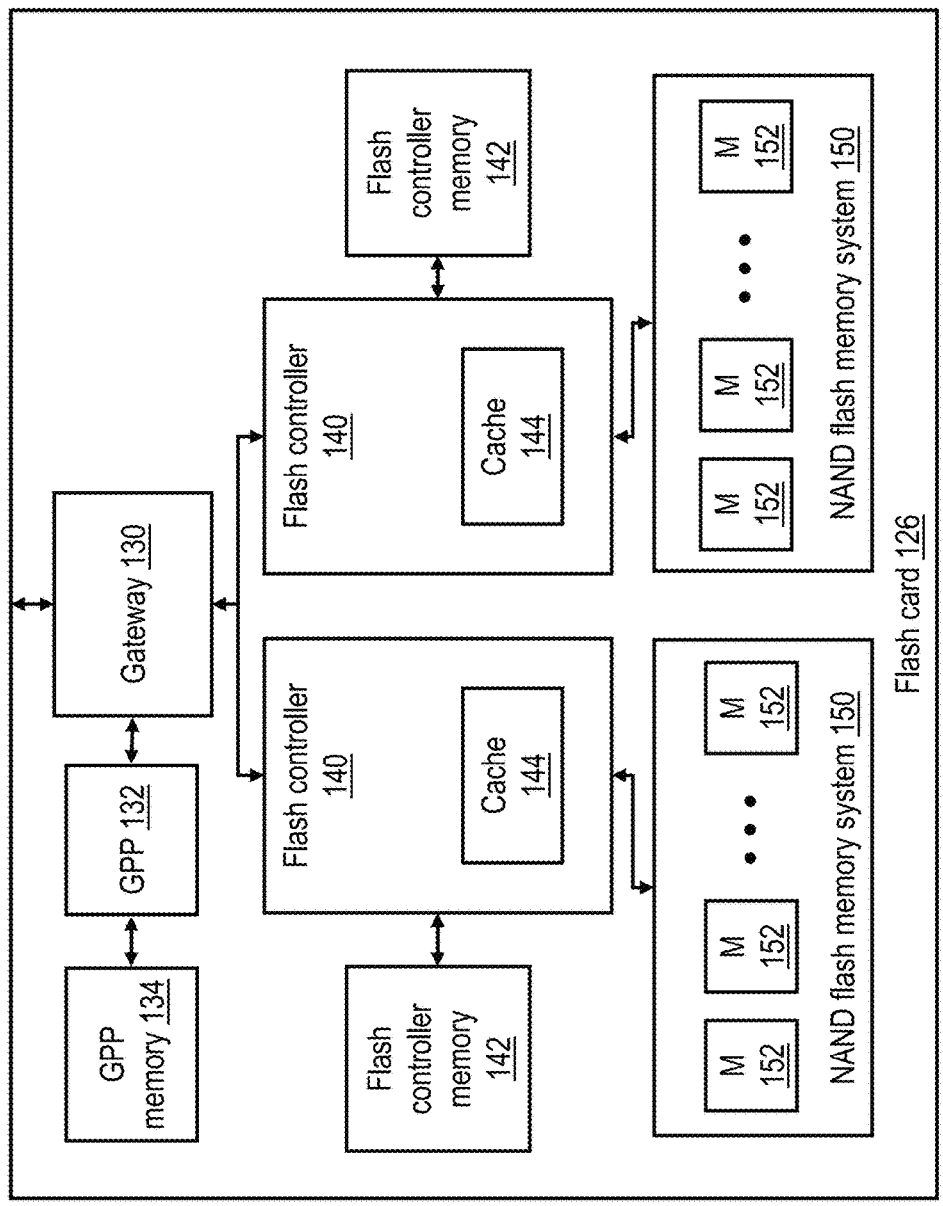
FIG. 1B is a more detailed block diagram of a flash card of the data storage system of FIG. 1A.

FIG. 1B depicts a more detailed block diagram of an exemplary embodiment of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform pre-processing on requests received by gateway 130 and/or to schedule servicing of the requests by flash card 126. GPP 132 is coupled to a GPP memory 134 (e.g., Dynamic Random Access Memory (DRAM)) that can conveniently buffer data created, referenced and/or modified by GPP 132 in the course of its processing or data flowing through the gateway 130 destined for one or more of the flash controllers 140.

Gateway 130 is further coupled to multiple flash controllers 140, each of which controls a respective NAND flash memory system 150. Flash controllers 140 can be implemented, for example, by an Application Specific Integrated Circuit (ASIC) and/or a Field Programmable Gate Array (FPGA) and/or a microprocessor, and each have an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write requests from gateway 130 that request to read data stored in NAND flash memory system 150 and/or to store data in NAND flash memory system 150. Flash controllers 140 service these requests, for example, by accessing NAND flash memory systems 150 to read or write the requested data from or into NAND flash memory systems 150 and/or by accessing their respective memory caches 144 (e.g., DRAM), which, in some embodiments, can form a part of flash controller memory 142 or flash controller 140. In a preferred embodiment, each flash controller 140 implements a cache management policy that retains in cache 144 pages that have been recently programmed into NAND flash memory system 150 until at least a predetermined delay time has elapsed since the pages were programmed. Further, in at least some embodiments, the cache management policy additionally retains, in cache 144, each lower page programmed in NAND flash memory system 150 at least until the corresponding upper page has satisfied its delay time in NAND flash memory system 150.

Flash controllers 140 implement a flash translation layer (FTL) that provides logical-to-physical address translation to enable access to specific memory locations within NAND flash memory systems 150. In general, an request received by flash controller 140 from a host device, such as a processor system 102, contains the logical block address (LBA) at which the data is to be accessed (read or written) and, if a write request, the write data to be stored to data storage system 120. The request may also specify the amount (or size) of the data to be accessed. Other information may also be communicated depending on the protocol and features supported by data storage system 120. The flash translation layer translates LBAs received from a RAID controller 124 into physical addresses assigned to corresponding physical location in NAND flash memory systems 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. In the embodiment shown in FIG. 1B, each NAND flash memory system 150 includes multiple (e.g., 32) individually addressable NAND flash memory storage devices 152. In the illustrated example, the flash memory storage devices 152 take the form of a board-mounted flash memory modules, for example, Multi-Level Cell (MLC), Three Level Cell (TLC), or Quad Level Cell (QLC) NAND flash memory modules. The effective storage capacity provided by flash memory storage devices 152 can be increased through the implementation of data compression, for example, by flash controllers 140 and/or high level controllers, such as GPPs 132, RAID controllers 124 or SMCs 123.

Figure 2:
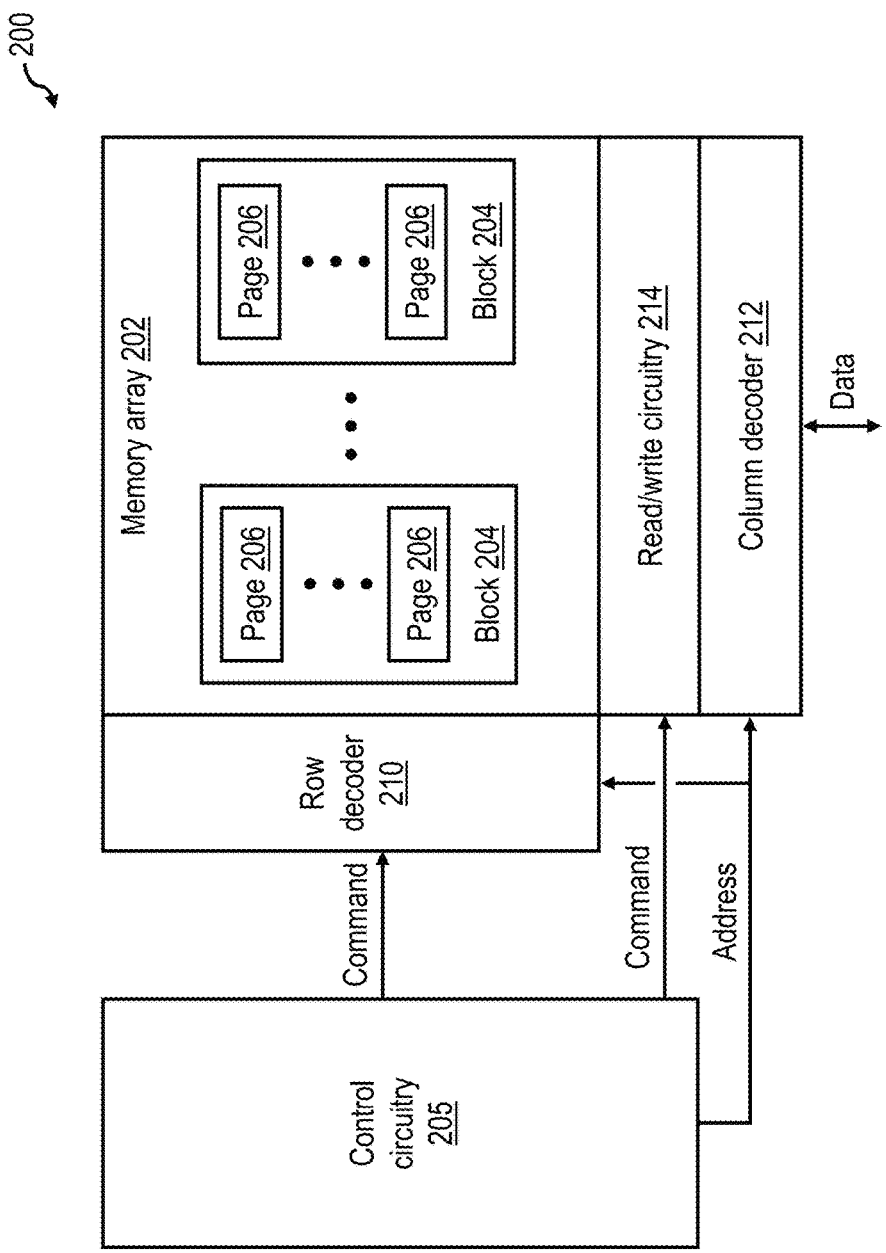
FIG. 2 depicts an exemplary NAND flash memory module in accordance with one embodiment.

Referring now to FIG. 2, there is depicted a block diagram of an exemplary flash memory module 200 that can be utilized to implement any of the NAND flash memory storage devices 152 of FIG. 1B. Flash memory module 200 includes one or more memory die, each implementing at least one memory array 202 formed of a two- or three-dimensional array of NAND flash memory cells. As indicated in FIG. 2, the memory cells within memory array 202 are physically arranged in multiple blocks 204, each in turn including multiple physical pages 206.

As is known to those skilled in the art, NAND flash memory, such as that employed in memory array 202, must be erased prior to being programmed. Further, NAND flash memory can be (but is not required to be) constrained by its construction such that the smallest granule of storage that can be erased is a block 204 and the smallest granule of storage that can be accessed by a read or write request is fixed at the size of a single physical page 206. It should be appreciated in this regard that the LBAs provided by host devices correspond to logical pages within a logical address space, where each logical page typically has a size of 4 kilobytes (kB). Physical pages 206, in contrast, typically have a larger size, for example, 16 kB, and can thus correspond to multiple logical pages.

Flash memory module 200 further includes a row decoder 210 through which word lines of memory array 202 can be addressed and a column decoder 212 through which bit lines of memory array 202 can be addressed. In addition, flash memory module 200 includes read/write circuitry 214 that enables the memory cells of a physical page 206 to be programmed or read in parallel. Flash controller 200 additionally includes control circuitry 205 that provides chip-level control of operation of memory array 202, including read and write accesses made to physical pages 206 in memory array 202, erasure of blocks 204, and the amplitude, duration and polarity of related voltages applied to memory array 202.

In a preferred embodiment, memory array 202 is implemented utilizing a multi-level technology, such as MLC. As noted above, control circuitry 205 preferably does not program associated upper and lower pages 206 in consecutive order, but instead interleaves programming of additional pages between programming associated upper and lower pages 206 in order to control cell-to-cell interference. The number of pages programmed between associated upper and lower pages 206 can vary between vendors and between memory technologies, e.g., even-odd bit-line architecture or all-bit-line architecture, MLC or TLC NAND flash, 2D or 3D NAND flash, etc.

Having described the general physical structure of one exemplary embodiment of a data storage system 120, certain operational aspects of data storage system 120 are now described with reference to FIG. 3, which is a high level flow diagram of the flash management functions and data structures employed by a GPP 132 and/or flash controller 140 in accordance with one embodiment.

Data storage system 120 does not generally allow external devices (e.g., hosts) to directly address and/or access the physical memory locations within NAND flash memory systems 150. Instead, data storage system 120 is generally configured to present to host devices one or more logical volumes each having a contiguous logical address space, thus allowing host devices to read and write data to and from logical block addresses (LBAs) within the logical address space while permitting one or more of the various levels of controllers (e.g., system management controller 123, RAID controllers 124, flash controllers 140 and GPP 132) to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 performs logical-to-physical address translation for an associated set of LBAs using a logical-to-physical address translation data structure, such as logical-to-physical translation (LPT) table 300, which can be stored, for example, in the associated flash controller memory 142. It should be noted that the logical address supplied to flash controller(s) 140 may be different from the logical address originally supplied to data storage system 120, since various components within data storage system 120 may perform address translation operations between the external devices and the flash controller(s) 140.

Flash management code running on the GPP 132 tracks erased blocks of NAND flash memory system 150 that are ready to be used in ready-to-use (RTU) queues 306, which may be stored, for example, in GPP memory 134. In the depicted embodiment, flash management code running on the GPP 132 maintains one RTU queue 306 per channel (i.e., per data bus), and an identifier of each erased block that is to be reused is enqueued in the RTU queue 306 corresponding to its channel. A build block stripes function 320 performed by flash management code running on the GPP 132 constructs new block stripes for storing data and associated parity information from the erased blocks enqueued in RTU queues 306. The new block stripes are then queued to the flash controller 140 for data placement. Block stripes are preferably formed of blocks residing in different channels, meaning that build block stripes function 320 can conveniently construct a block stripe by drawing each block of the new block stripe from a different RTU queue 306. In general, build block stripes function 320 attempts to construct stripes from blocks of approximately equal health (i.e., expected remaining useful life).

In response to write request received from a host, such as a processor system 102, a data placement function 310 of flash controller 140 determines by reference to LPT table 300 whether the target LBA(s) indicated in the write request is/are currently mapped to physical memory page(s) in NAND flash memory system 150 and, if so, changes the status of each data page currently associated with a target LBA to indicate that the associated data is no longer valid. In addition, data placement function 310 allocates a page stripe if necessary to store the write data of the write request and any non-updated data (i.e., for write requests smaller than a logical page, the remaining valid data from a previous write to the same logical address which is not being overwritten and which must be handled in a read-modify-write manner) from an existing page stripe, if any, targeted by the write request, and/or stores the write data of the write request and any non-updated (i.e., still valid) data from an existing page stripe, if any, targeted by the write request to an already allocated page stripe which has free space left. The page stripe may be allocated from either a block stripe already allocated to hold data or from a new block stripe built by build block stripes function 320. In a preferred embodiment, the page stripe allocation can be based on the health of the blocks available for allocation and the "heat" (i.e., estimated or measured write access frequency) of the LBA of the write data. Data placement function 310 then writes the write data, associated metadata (e.g., cyclic redundancy code (CRC) and error correcting code (ECC) values), and parity information for the page stripe in the allocated page stripe. Flash controller 140 also updates LPT table 300 to associate the physical page(s) utilized to store the write data with the LBA(s) indicated by the host device. Thereafter, flash controller 140 can access the data to service host read requests by reference to LPT table 300 as further illustrated in FIG. 3.

Once all pages in a block stripe have been written, flash controller 140 places the block stripe into one of occupied block queues 302, which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 312. Garbage collector 312 selects particular block stripes for garbage collection based on a number of factors including, for example, the health of the blocks 204 within the block stripes and how much of the data within the blocks 204 is invalid. In the illustrated example, garbage collection is performed on entire block stripes, and flash management code running on GPP 132 logs the block stripes ready to be recycled in a relocation queue 304, which can conveniently be implemented in the associated flash controller memory 142 or GPP memory 134.

The flash management functions performed by GPP 132 or flash controller 140 additionally include a relocation function 314 that relocates the data held in block stripes enqueued in relocation queue 304. To relocate such data, relocation function 314 updates LPT table 300 to remove the current association between the logical and physical addresses of the data. In addition, relocation function 314 issues relocation write requests to data placement function 310 to request that the valid data of the old block stripe be written to a new block stripe in NAND flash memory system 150. Once all remaining valid data has been moved from the old block stripe, the old block stripe is passed to dissolve block stripes function 316, which decomposes the old block stripe into its constituent blocks 204, thus disassociating the blocks 204. Each of the blocks 204 formerly forming the dissolved block stripe is then erased under the direction of flash controller 140 and/or the control circuitry 205 of the relevant flash memory module 200, and a corresponding program/erase (P/E) cycle count 334 for each erased block is incremented. Based on the health metrics of each erased block 204 (e.g., bit error rate (BER) metrics, uncorrectable errors, P/E cycle count, etc.), each erased block 204 is either retired (i.e., withdrawn from use) by a block retirement function 318 among the flash management functions executed on GPP 132, or alternatively, prepared for reuse by placing the block 204 on the appropriate ready-to-use (RTU) queue 306 in the associated GPP memory 134.

Figure 3:
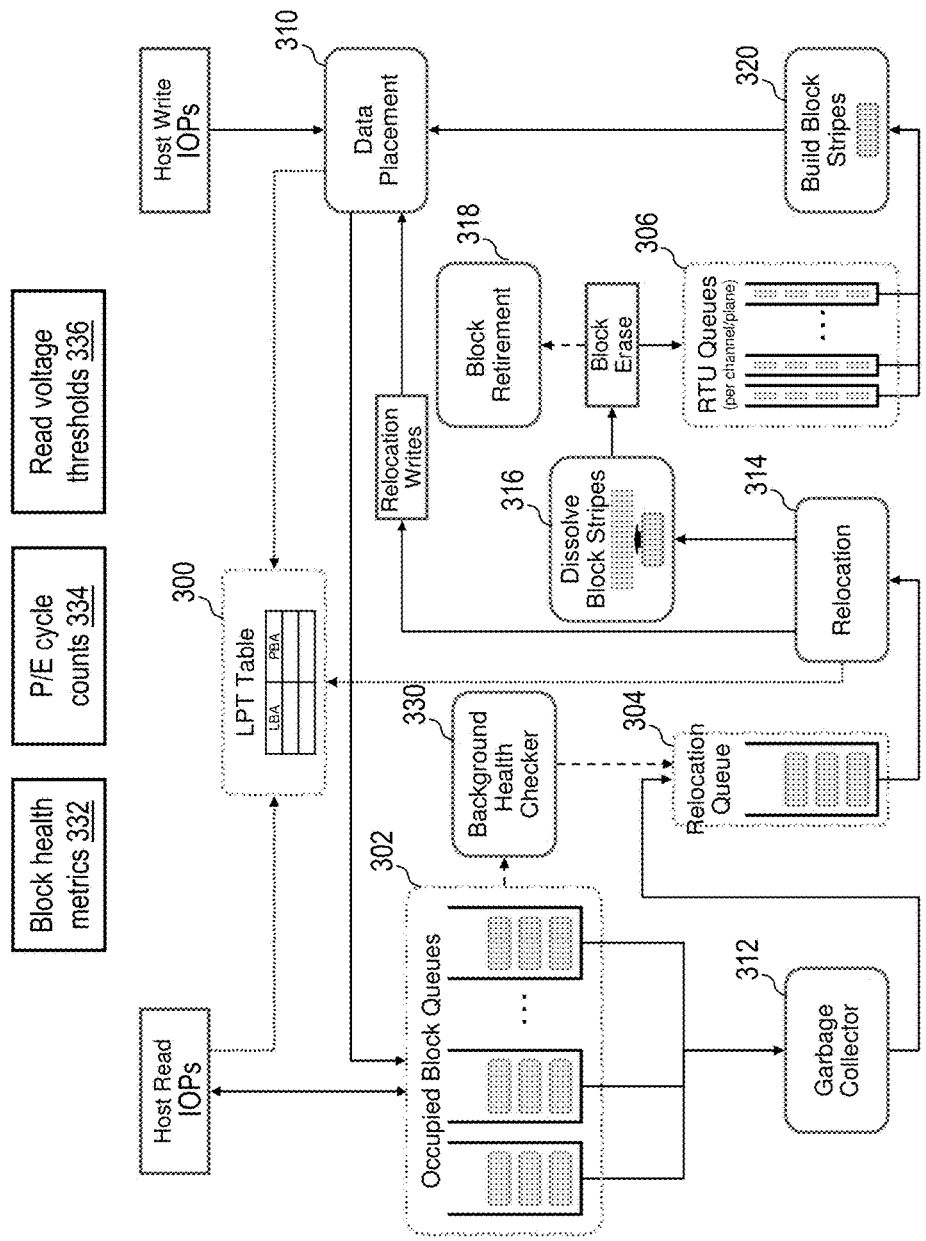
FIG. 3 is a high level flow diagram of the flash management functions and data structures employed in flash management in accordance with one embodiment.

As further shown in FIG. 3, the flash management functions executed on GPP 132 and/or flash controller 140 additionally include a background health checker 330. Background health checker 330, which operates independently of the read and write requests of hosts such as processor systems 102, continuously determines one or more block health metrics 332 for blocks belonging to block stripes recorded in occupied block queues 302. Based on the one or more of the block health metrics 332, background health checker 330 places block stripes on relocation queue 304 for handling by relocation function 314. Key block health metrics 332 preferably monitored and recorded by background health checker relate to the bit error rate (BER) metrics observed for valid blocks and physical pages, and may include, for example, the worst page BER of each block, the mean page BER of each block, the rates of change of the worst page BER and mean page BER of each block, etc. In order to obtain the most accurate health estimate possible, health can be determined from an analysis of valid and invalid data, thereby ensuring that blocks containing almost entirely invalid data are fully analyzed to determine overall block health.

Figure 4A:
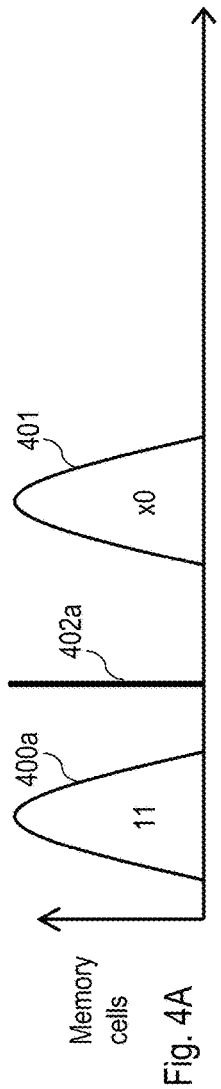
FIG. 4A illustrates exemplary threshold voltage distributions in an exemplary multi-level cell (MLC) NAND flash memory following programming of only the lower page.
Figure 4B:
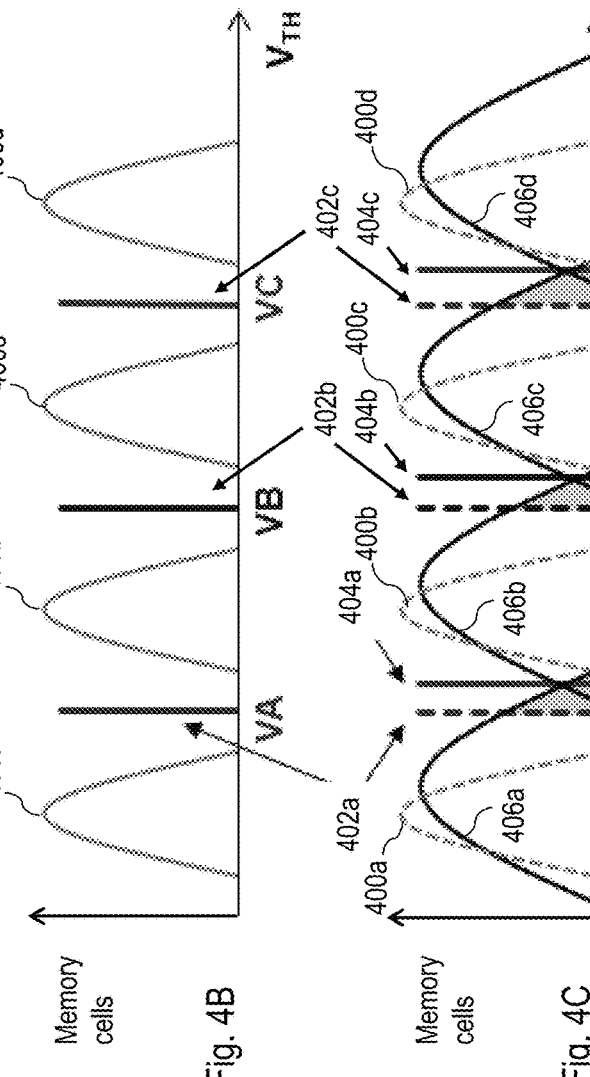
FIG. 4B depicts exemplary programmed threshold voltage distributions for an exemplary MLC NAND flash memory following programming of the upper page.

Referring now to FIGS. 4A-4B, there is depicted initial and subsequent programmed threshold voltage ($V_{TH}$) distributions for an exemplary multi-level cell (MLC) NAND flash memory. As shown in FIG. 4A, when the cells of a lower page 206 of a MLC NAND flash memory storage device 152 are first programmed, the programmed threshold voltage of the cells initially establishes two voltage distributions 400a (representing a least significant bit (LSB) value of 1) and 401 (representing a LSB of 0). After an appropriate technology-specific delay time, the bit values of the various memory cells can be decoded accurately by application of a read voltage threshold VX 402a.

When the corresponding upper page 206 of these memory cells are subsequently programmed so that each memory cell stores two bits of data, each of the memory cells will then have one of four voltage distributions 400a, 400b, 400c and 400d, respectively representing bit values 11, 10, 00 and 01, as shown in FIG. 4B. After observance of the applicable delay time, the bit values of the various memory cells can be decoded accurately by application of initial read voltage thresholds VA 402a, VB 402b and VC 402c.

As depicted in both FIGS. 4A and 4B, when memory cells are initially placed in service and programmed, the programmed threshold voltage distributions are tight and well defined. Through use, the memory cells will be damaged by, among other things, the voltage stress associated with program/erase (P/E) cycling. As a result of this damage, the distribution of memory cell voltages will eventually no longer reflect the tight distributions shown in FIGS. 4A-4B, but will instead be characterized by broader and/or shifted voltage distributions 406a, 406b, 406c, 406d shown in FIG. 4C. Because of the degradation of the voltage distributions, bit values can be erroneously decoded if read voltage thresholds VA 402a, VB 402b and VC 402c continue to be applied, and the bit error rate (BER) for reads to the block will consequently increase.

Figure 4C:
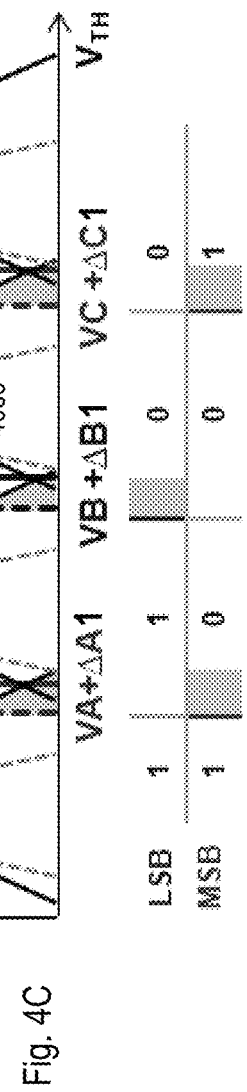
FIG. 4C illustrates degradation of the programmed threshold voltage distributions for an exemplary MLC NAND flash memory following programming of the upper page.

To reduce the BER for a memory unit, GPP 132 and/or flash controller 140 preferably periodically adapts the read voltage thresholds 336 (see, FIG. 3) for one or more individual memory units (e.g., a page, page groups and/or a block) either negatively (not illustrated) or positively (as shown explicitly in FIG. 4C). For example, in FIG. 4C read voltage thresholds VA 402a, VB 402b and VC 402c are each shifted positively by an individually determined offset $\Delta A1$, $\Delta B1$ or $\Delta C1$ selected to reduce and/or minimize the BER. Thus, in the example of FIG. 4C, initial read voltage thresholds VA 402a, VB 402b and VC 402c are replaced by subsequent read voltage thresholds VA+$\Delta A1$ 404a, VB+$\Delta B1$ 404b and VC+$\Delta C1$ 404c, respectively. In general, the signs and/or magnitudes of the read voltage threshold offsets selected by GPP 132 and/or flash controller 140 can and will vary over the lifetime of a block.

As noted above, there is delay period following the programming of the cells of multi-level NAND flash memories (e.g., the flash memory storage devices 152 of NAND flash memory systems 150) during which any reads will be subject to elevated (and in some cases, unacceptably high) error rates. Although it is possible to avoid high error rates by simply delaying read-after-write operations until after the relevant delay period has elapsed, in practice such a policy may lead to unacceptable read performance for data storage systems, such as data storage system 120. However, as described below with reference to FIG. 5, such read-after-write errors can be mitigated through intelligent use of a cache (e.g., cache 144) and/or application of appropriate read voltage threshold offsets.

Figure 5:
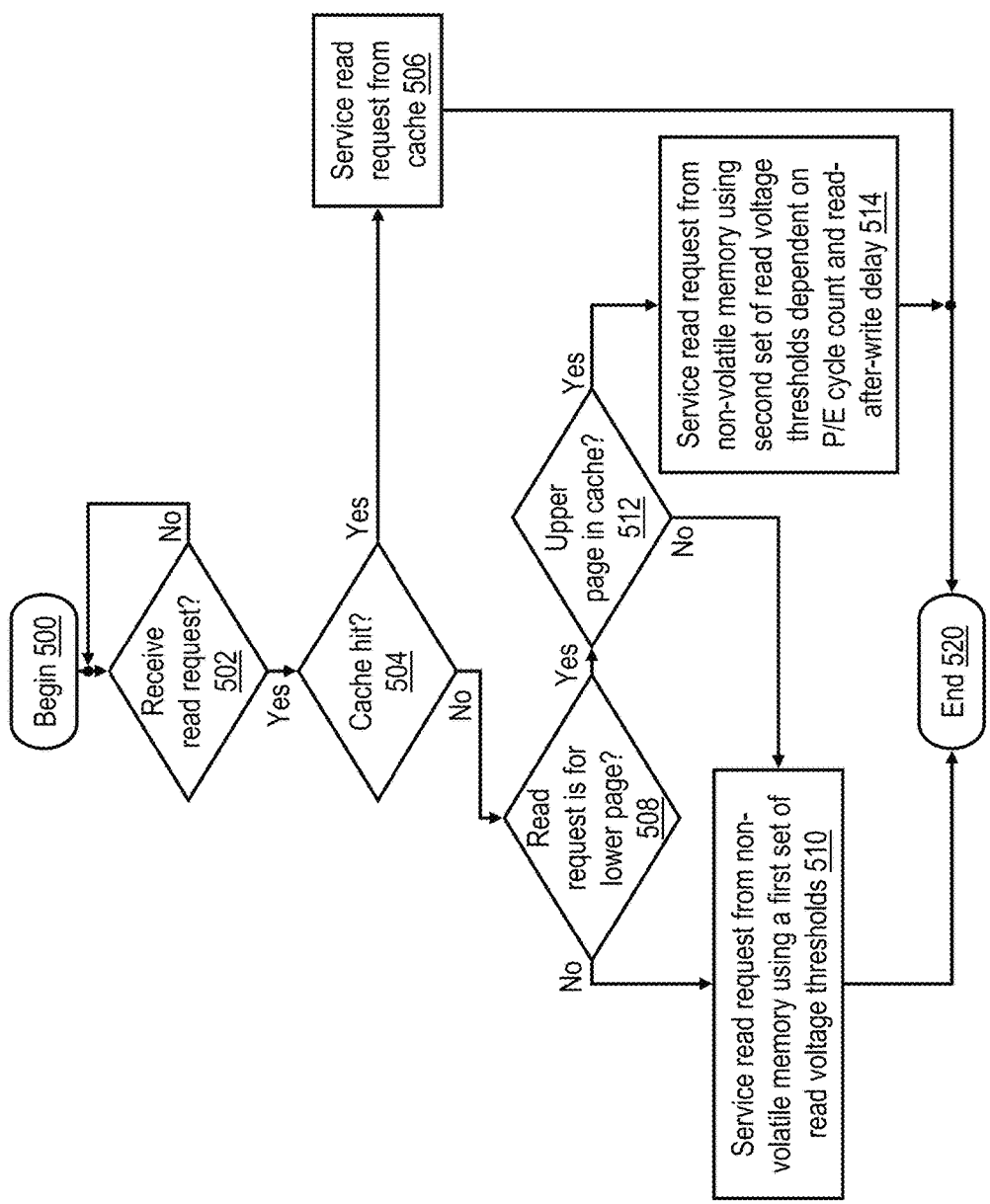
FIG. 5 is a high level logical flowchart of an exemplary process for servicing a read request such that read errors following programming are mitigated in accordance with one embodiment.

With reference now to FIG. 5, there is a high level logical flowchart of an exemplary process for servicing read requests such that read errors incurred for reads immediately following programming are mitigated in accordance with one embodiment. The process of FIG. 5 is preferably performed by a controller, such as a flash controller 140 and/or GPP 132, in hardware or in hardware executing software and/or firmware. For ease of description, the process is described below as being performed by a flash controller 140.

The process of FIG. 5 begins at block 500 and then proceeds to block 502, which illustrates a flash controller 140 awaiting receipt of a read request, such as a read request originated by a processor system 102 or a management read request originated, for example, by background health checker 330 or another component of flash controller 140 or GPP 132. In response to a determination at block 502 that no read request has been received, the process iterates at block 502 until a read request is received.

In response to a determination at block 502 that a read request has been received, flash controller 140 determines whether or not the target LBA of the read request, which specifies which page(s) are to be read, hits in the cache 144 of the flash controller 140. If so, the process passes to block 506, which illustrates flash controller 140 servicing the read request from the pages of data temporarily buffered in cache 144 rather than from NAND flash memory system 150. As noted above, it is preferred if flash controller 140 implements a cache management policy that retains each page (i.e., upper page or lower page) programmed in NAND flash memory system 150 within cache 144 until at least the delay time has elapsed following the programming of that page. Observance of this first policy component would mean that any read request received by flash controller 140 within the delay time of the target page(s) would be serviced from cache 144 as depicted at block 506, thus eliminating transient read errors that would otherwise be induced by performing read-after-write of the target page(s) from NAND flash memory system 150. It is also preferred, if possible, that the cache management policy implemented by flash controller 140 retains each lower page of data programmed into NAND flash memory system 150 within the cache 144 at least until the associated upper page is programmed and the delay time of the upper page has elapsed. This additional, independently implementable second policy component would eliminate any transient read errors that would otherwise be induced by performing a read from NAND flash memory system 150 of a lower page within the delay time of the associated upper page. The present disclosure appreciates, however, that flash controller 140 may have many open block stripes at any given time and that the finite capacity of cache 144 may prevent flash controller 140 from implementing this second cache management policy component in all cases. However, flash controller 140 may still mitigate read errors induced by read-after-write operations by intelligent selection of the read voltage thresholds utilized to read data from NAND flash memory system 150 as described further below.

Returning to block 504, in response to flash controller 140 determining that the read request misses in cache 144, the process passes to block 508, which illustrates flash controller 140 determining whether or not the read request specifies a target LBA that corresponds to a lower page in NAND flash memory system 150. If not, meaning that the target LBA corresponds to an upper page in NAND flash memory system 150, flash controller 140 services the read request by reading the specified upper page from NAND flash memory system 150 (block 510). In general, the fact that the target upper page no longer resides in cache 144 indicates the delay time for the upper page has elapsed. Consequently, as indicated in block 510, flash controller 140 reads the upper page utilizing a generally applicable first set of read voltage thresholds 336 (e.g., $VA \pm \Delta A1$, $VB \pm \Delta B1$ and $VC \pm \Delta C1$) that are selected to compensate for the shifting and broadening of the voltage distributions representing the data bits due, for example, to the wear caused by P/E cycling.

Referring again to block 508, in response to a determination that the target LBA of the read request corresponds to a lower page, the process proceeds to block 512. Block 512 illustrates flash controller 140 determining whether or not the data of the upper page associated with the target lower page resides in cache 144. Because the upper page is preferably cached in cache 144 for the duration of its delay time, a determination at block 512 that the upper page is not in cache 144 indicates that the read request for the lower page was not received during the delay time of the associated upper page and that consequently no read errors due to read-after-write effects should be incurred by reading the target lower page from NAND flash memory system 150. Flash controller 140 therefore services the read request for the lower page from NAND flash memory system 150, as depicted at block 510 and as described above.

Returning to block 512, a determination that the associated upper page of the target lower page of the read request is held in cache 144 indicates to flash controller 140 that the read request may have been received during the delay time of the associated upper page and may therefore be subject to excessive read errors if read from NAND flash memory system 150 utilizing the first set of read voltage thresholds 336 employed at block 510. Consequently, flash controller 140 mitigates such read errors by reading the target lower page from NAND flash memory system 150 utilizing a different second set of read voltage thresholds selected to reduce read errors during the delay time of the associated upper page (block 514). For example, in at least one embodiment in which the first set of read voltage thresholds can be expressed as $\{VA \pm \Delta A1, VB \pm \Delta B1, VC \pm \Delta C1\}$, the second set of read voltage thresholds can be expressed as $\{VA \pm \Delta A1 \pm \Delta A2, VB \pm \Delta B1 \pm \Delta B2, VC \pm \Delta C1 \pm \Delta C2\}$, where $\Delta A2$, $\Delta B2$ and $\Delta C2$ are voltage offsets selected to provide additional compensation for reads performed during the delay time. In some embodiments, $\Delta A2$, $\Delta B2$ and $\Delta C2$ will all have the same sign and magnitude. In other embodiments, the magnitudes and/or signs of $\Delta A2$, $\Delta B2$ and $\Delta C2$ can differ. Further, in some embodiments, the values of $\Delta A2$, $\Delta B2$ and $\Delta C2$ may be determined from vendor-supplied read retry (RR) values. In at least some embodiments, the magnitude(s) and/or sign(s) of ΔA2, ΔB2 and ΔC2 will vary depending on the read-after-write delay.

Following any of blocks 506, 510, or 514, the process of FIG. 5 ends at block 520 until flash controller 140 receives a subsequent read request.

Figure 6:
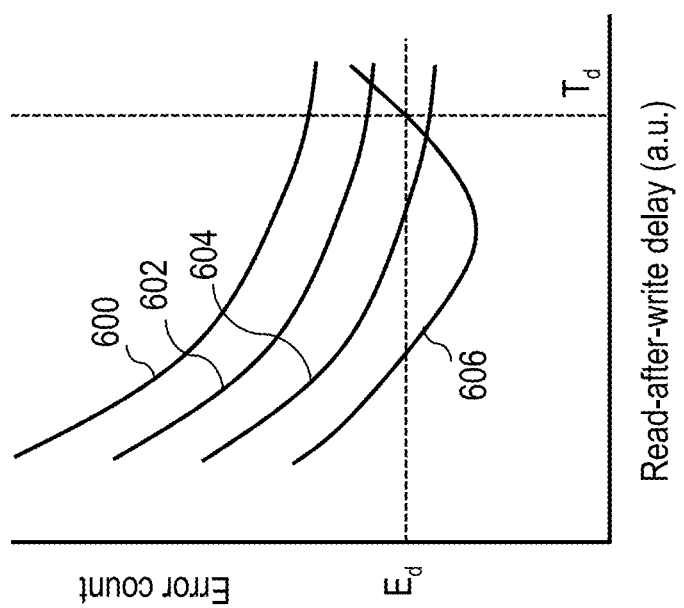
FIG. 6 is a graph of exemplary bit error rate curves for a multi-level NAND flash memory that depicts read errors incurred in the read of a page as a function of read-after-write delay for different read voltage threshold offsets.

Referring now to FIG. 6, there are illustrated exemplary bit error rate curves for a multi-level NAND flash memory that depict read errors incurred when reading a page as a function of the read-after-write delay. In the example of FIG. 6 each of curves 600-606 represents the error count corresponding to different sets of read voltage offsets ΔA2, ΔB2 and ΔC2, where in general, the values of the offsets ΔA2, ΔB2 and ΔC2 may be different. Offsets ΔA2, ΔB2 and ΔC2 are selected to compensate for the delay time for the threshold voltage distributions ($V_{TH}$) to settle following programming. Thus, offsets ΔA2, ΔB2 and ΔC2 corresponding to curves 600-606 may consist of different negative corrective values and in general are different from offsets ΔA1, ΔB1 and ΔC1 used in FIG. 4C to compensate for cycling or retention effects. Curves 600-606 illustrate that in general the error count improves during the delay time after programming and that the improvement may depend on the set of read voltage offsets ΔA2, ΔB2 and ΔC2 that is used. More specifically FIG. 6 illustrates that a given set of read voltage offsets, e.g., the one corresponding to curve 606, may provide lower error count for short read-after-write delay; however, for a longer read-after-write delay the error count may increase compared to another set of read voltage thresholds, e.g., the one corresponding to curve 604. The illustrative example of curves 600-606 provides a representation of the error count when reading a page in multi-level NAND flash memory as a function of the read-after-write delay, e.g., when reading a lower page after having programmed that lower page in the first pass of the program process in FIG. 4A, or when reading an upper page after having programmed that upper page in the second pass of the program process in FIG. 4B, or when reading a lower page after having programmed its corresponding upper page in the second pass of the program process in FIG. 4B. FIG. 6 additionally shows that, in general, flash controller 140 may define an error count threshold ($E_d$) and associated delay threshold ($T_d$), where the error threshold determines an acceptable number of errors that can be effectively corrected, e.g., by the applied error control correction (ECC), and the delay threshold may determine an acceptable delay time that the controller can afford to hold the data of the programmed pages in cache 144. Depending on all or a subset of parameters such as the error count threshold ($E_d$), the delay threshold ($T_d$), and the aging of the device (e.g., the number of program/erase cycles), flash controller 140 may select an appropriate set of read voltage offsets ΔA2, ΔB2 and ΔC2 to read a recently programmed page if the read-after-write delay is lower than the delay threshold ($T_d$). It can be appreciated by those skilled in the art that in FIG. 6 the absolute values of the error count as a function of the read-after-write delay for different read voltage offsets and the absolute values of the read voltage offsets ΔA2, ΔB2 and ΔC2 may depend on the type of the page that is read, e.g., lower page or upper page, or on the aging of the block that the page belongs to, e.g., the number of program/erase cycles to which the block has been subjected.

Flash controller 140 can adjust read voltage thresholds at block 514 of FIG. 5 based on characterization data such as that depicted in FIG. 6 in a number of different ways. For example, in some embodiments, flash controller 140 can utilize a bank of timers (e.g., counters) to track each write to NAND flash memory system 150 until the expiration of the associated delay time. Based on the associated timer value (which indicates the read-after-write delay), the P/E cycle count, and characterization data such as that illustrated in FIG. 6, flash controller 140 can dynamically select the appropriate offsets ΔA2, ΔB2 and ΔC2 to reduce or minimize read errors for reads made to NAND flash memory 150 at block 514. In other embodiments, the expense and chip area required to implement the bank of timers can be avoided by flash controller 140 implementing a data structure, such as a lookup table, that stores multiple candidate sets of offsets ΔA2, ΔB2 and ΔC2 appropriate for different page types, i.e., reading a lower page following programming of that lower page, reading an upper page following programming of that upper page, reading a lower page following programming of its associated upper page, and for various P/E cycle counts and read-after-write delays. In one exemplary embodiment, the data structure may store a group of three to five sets of offset values of ΔA2, ΔB2 and ΔC2 for different page types and different read-after-write delays (e.g., a short delay, a medium delay and a long delay) for each of four to eight different ranges of P/E cycles. In this embodiment, when performing a read from NAND flash memory 150 at block 514 of FIG. 5, the flash controller 140 can select a group of offset value sets corresponding to the current P/E cycle count for the page type, read the page utilizing each of the sets of offset values in the selected group, and then use the page data resulting in the lowest associated error count.

As has been described, in at least one embodiment, read errors following programming in a multi-level non-volatile memory are mitigated by a controller of the non-volatile memory. The controller temporarily buffers, in a cache, pages of data programmed into the non-volatile memory. In response to receiving a read request for a target page of data programmed into the non-volatile memory, where the read request is received during a delay time affecting the target page, the controller services the read request by accessing data of the target page in the cache in response to the read request hitting in the cache. The controller instead services the read request from the non-volatile memory in response to the read request missing in the cache. When servicing the read request from the non-volatile memory, the controller preferably reads the target page from the non-volatile memory utilizing a set of read voltage thresholds determined based on the read-after-write delay. The described technique is applicable to a variety of memory technologies, including MLC, TLC and QLC NAND flash memories.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

In addition, although embodiments have been described that include use of a multi-level cell NAND flash memory, it should be appreciated that embodiments of the present invention can also be used with any other type of non-volatile random access memory (NVRAM), which may store any number of bits per cell.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of mitigating read errors following programming in a multi-level non-volatile memory, the method comprising:
   in response to a write request, a controller of the non-volatile memory programming data into the non-volatile memory to service the write request and temporarily buffering, in a cache, pages of the data programmed into the non-volatile memory for at least a predetermined time period following the programming;
   receiving an initial read request after the programming for a target page of the data programmed into the non-volatile memory;
   in response to receiving the initial read request during the predetermined time period after programming, the initial read request hitting in the cache and the controller servicing the initial read request by accessing data of the target page in the cache and not from the non-volatile memory; and
   in response to the initial read request missing in the cache, the controller servicing the initial read request from the non-volatile memory.

2. The method of claim 1, wherein servicing the initial read request from the non-volatile memory includes reading the target page from the non-volatile memory utilizing a set of read voltage thresholds determined based on an applicable read-after-write delay.

3. The method of claim 2, wherein the set of read voltage thresholds is further determined based on a program/erase cycle count applicable to the target page.

4. The method of claim 2, wherein the set of read voltage thresholds is further determined based on whether a type of the target page is an upper page or a lower page.

5. The method of claim 2, wherein:
   the set of read voltage thresholds is one of a plurality of sets of read voltage thresholds; and
   the reading includes reading data of the target page from the non-volatile memory utilizing multiple of the plurality of sets of read voltage thresholds and returning the data containing a fewest number of errors.

6. The method of claim 1, wherein:
   the target page is a lower page with an associated upper page already programmed; and
   servicing the initial read request from the non-volatile memory includes reading the target page from the non-volatile memory utilizing a set of read voltage thresholds determined based on whether an associated upper page is in the cache.

7. A data storage system, comprising:
   a controller for a non-volatile memory, wherein the controller is configured to perform:
   in response to a write request, programming data into the non-volatile memory to service the write request and temporarily buffering, in a cache, pages of the data programmed into the non-volatile memory for at least a predetermined time following the programming;
   receiving an initial read request after the programming for a target page of the data programmed into the non-volatile memory;
   in response to receiving the initial read request during the predetermined time period, servicing the initial read request by accessing data of the target page in the cache and not the non-volatile memory; and
   servicing the initial read request from the non-volatile memory and not the cache memory in response to the initial read request missing in the cache.

8. The data storage system of claim 7, wherein servicing the initial read request from the non-volatile memory includes reading the target page from the non-volatile memory utilizing a set of read voltage thresholds determined based on an applicable read-after-write delay.

9. The data storage system of claim 8, wherein the set of read voltage thresholds are further determined based on a program/erase cycle count applicable to the target page.

10. The data storage system of claim 8, wherein the set of read voltage thresholds are further determined based on whether a type of the target page is an upper page or a lower page.

11. The data storage system of claim 8, wherein:
    the set of read voltage thresholds is one of a plurality of sets of read voltage thresholds; and
    the reading includes reading data of the target page from the non-volatile memory utilizing multiple of the plurality of sets of read voltage thresholds and returning the data containing a fewest number of errors.

12. The data storage system of claim 7, wherein:
    the target page is a lower page with an associated upper page already programmed; and
    servicing the initial read request from the non-volatile memory includes reading the target page from the non-volatile memory utilizing a set of read voltage thresholds determined based on whether an associated upper page is in the cache.

13. The data storage system of claim 7, and further comprising the non-volatile memory coupled to the controller.

14. A computer program product, the computer program product comprising a computer readable storage medium having program instructions embodied therewith, the program instructions executable by a controller of a non-volatile memory to cause the controller to perform:
    in response to a write request, programming data into the non-volatile memory to service the write request and temporarily buffering, in a cache, pages of the data programmed into the non-volatile memory for at least a predetermined time period following the programming;
    receiving an initial read request after the programming for a target page of the data programmed into the non-volatile memory;

in response to receiving the initial read request during the predetermined time period after programming, servicing the initial read request by accessing data of the target page in the cache and not from the non-volatile memory; and servicing the initial read request from the non-volatile memory and not the cache memory in response to the initial read request missing in the cache.

15. The computer program product of claim 14, wherein servicing the initial read request from the non-volatile memory includes reading the target page from the non-volatile memory utilizing a set of read voltage thresholds determined based on an applicable read-after-write delay.

16. The computer program product of claim 15, wherein the set of read voltage thresholds are further determined based on a program/erase cycle count applicable to the target page.

17. The computer program product of claim 15, wherein the set of read voltage thresholds are further determined based on whether a type of the target page is an upper page or a lower page.

18. The computer program product of claim 15, wherein:
the set of read voltage thresholds is one of a plurality of sets of read voltage thresholds; and
the reading includes reading data of the target page from the non-volatile memory utilizing multiple of the plurality of sets of read voltage thresholds and returning the data containing a fewest number of errors.

19. The computer program product of claim 14, wherein:
the target page is a lower page with an associated upper page already programmed; and
servicing the initial read request from the non-volatile memory includes reading the target page from the non-volatile memory utilizing a set of read voltage thresholds determined based on whether an associated upper page is in the cache.

* * * * *